United States Patent
Graham et al.

(10) Patent No.: US 11,915,255 B1
(45) Date of Patent: Feb. 27, 2024

(54) SYSTEMS AND METHODS FOR CONTEXTUAL SPENDING CORRELATION

(71) Applicant: UNITED SERVICES AUTOMOBILE ASSOCIATION (USAA), San Antonio, TX (US)

(72) Inventors: Richard Daniel Graham, Plano, TX (US); Ruthie Lyle, Durham, NC (US); Matthew C. Reedy, San Antonio, TX (US); Jeanie Graciela Lopez, San Antonio, TX (US); Paula Ann Whittington, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 440 days.

(21) Appl. No.: 16/820,070

(22) Filed: Mar. 16, 2020

Related U.S. Application Data

(60) Provisional application No. 62/818,205, filed on Mar. 14, 2019.

(51) Int. Cl.
| | | |
|---|---|---|
| *G09B 19/18* | (2006.01) | |
| *G06N 5/04* | (2023.01) | |
| *G06N 20/00* | (2019.01) | |
| *G06Q 30/0201* | (2023.01) | |
| *G06Q 30/0204* | (2023.01) | |
| *G06Q 40/00* | (2023.01) | |
| *G06Q 40/12* | (2023.01) | |
| *H04L 67/50* | (2022.01) | |

(52) U.S. Cl.
CPC ......... *G06Q 30/0205* (2013.01); *G06N 5/04* (2013.01); *G06N 20/00* (2019.01); *G06Q 30/0201* (2013.01); *G06Q 30/0206* (2013.01); *G06Q 40/00* (2013.01); *G06Q 40/12* (2013.12); *G09B 19/18* (2013.01); *H04L 67/535* (2022.05)

(58) Field of Classification Search
CPC .............................. G06Q 40/00; G06Q 40/12
See application file for complete search history.

(56) References Cited

U.S. PATENT DOCUMENTS

| | | | | |
|---|---|---|---|---|
| 8,285,622 B1 * | 10/2012 | Rao | ........................ | G06Q 40/02 705/36 R |
| 8,296,206 B1 * | 10/2012 | Del Favero | ............ | G06Q 40/02 705/1.1 |

(Continued)

OTHER PUBLICATIONS

Mangleburg, Tamara F., Patricia M. Doney, and Terry Bristol. "Shopping with friends and teens' susceptibility to peer influence." Journal of retailing 80.2 (2004): 101-116. (Year: 2004).*

(Continued)

*Primary Examiner* — Asfand M Sheikh
(74) *Attorney, Agent, or Firm* — BakerHostetler

(57) ABSTRACT

Systems and methods receive contextual data related to spending as well as spending data. Correlations are determined to explain variables that influence spending amounts or rates. Systems and methods can collect user spending context data associated with a user, generate spending correlations between variables of the user spending context data, determine a next event based on at least one of the location data and the relationship data, and generate a next event value for the next event having at least a subset of the variables.

16 Claims, 4 Drawing Sheets

(56) References Cited

U.S. PATENT DOCUMENTS

| | | | | |
|---|---|---|---|---|
| 8,879,155 | B1* | 11/2014 | Teller | G06F 3/013 |
| | | | | 359/13 |
| 9,105,047 | B1* | 8/2015 | Curran | G06Q 30/0255 |
| 10,210,569 | B1* | 2/2019 | Kim | G06Q 20/0855 |
| 10,956,850 | B2* | 3/2021 | Deshpande | G06Q 10/06315 |
| 10,963,971 | B1* | 3/2021 | Greene | H04L 63/10 |
| 2011/0238755 | A1* | 9/2011 | Khan | G06Q 50/01 |
| | | | | 709/204 |
| 2012/0030081 | A1* | 2/2012 | Ross | G06Q 40/00 |
| | | | | 705/35 |
| 2013/0030994 | A1* | 1/2013 | Calman | G06Q 40/00 |
| | | | | 705/40 |
| 2013/0054314 | A1* | 2/2013 | Ross | G06Q 40/025 |
| | | | | 705/14.1 |
| 2014/0222636 | A1* | 8/2014 | Cheng | G06Q 50/01 |
| | | | | 705/35 |
| 2014/0244389 | A1* | 8/2014 | Konig | G06Q 30/0255 |
| | | | | 705/14.53 |
| 2014/0258022 | A1* | 9/2014 | Zamer | G06Q 30/0631 |
| | | | | 705/26.7 |
| 2015/0073952 | A1* | 3/2015 | Ventura | G06Q 40/12 |
| | | | | 705/30 |
| 2016/0180386 | A1* | 6/2016 | Konig | G06Q 30/0255 |
| | | | | 705/14.55 |
| 2016/0350867 | A1* | 12/2016 | Votaw | G06F 16/287 |
| 2017/0098197 | A1* | 4/2017 | Yu | G16H 10/60 |
| 2017/0124907 | A1* | 5/2017 | Sasidhar | G09B 5/02 |
| 2017/0236215 | A1* | 8/2017 | Eisen | G06N 20/10 |
| | | | | 705/35 |
| 2018/0240108 | A1* | 8/2018 | Boss | G06Q 40/02 |
| 2018/0276345 | A1* | 9/2018 | Von Cavallar | G16H 20/70 |
| 2019/0188769 | A1* | 6/2019 | Gokanakonda | G10L 13/02 |
| 2019/0228397 | A1* | 7/2019 | Madden | G06Q 20/204 |
| 2020/0058079 | A1* | 2/2020 | Hosp | G06N 20/00 |
| 2020/0380610 | A1* | 12/2020 | Lopez | H04W 4/12 |
| 2021/0110359 | A1* | 4/2021 | Outlaw | G06Q 20/227 |
| 2022/0277383 | A1* | 9/2022 | Sihavong | G06Q 30/0641 |
| 2022/0327954 | A1* | 10/2022 | Margolin | G09B 19/00 |
| 2022/0391938 | A1* | 12/2022 | Sridhar | G06Q 30/0224 |

OTHER PUBLICATIONS

Bogomolov, Andrey, et al. "Daily stress recognition from mobile phone data, weather conditions and individual traits." Proceedings of the 22nd ACM international conference on Multimedia. 2014, pp. 477-486. (Year: 2014).*

* cited by examiner

SYSTEMS AND METHODS FOR CONTEXTUAL SPENDING CORRELATION

This patent application claims priority to and the benefit of provisional patent application 62/818,205 filed Mar. 14, 2019, which is incorporated herein by reference in its entirety. The subject matter of this disclosure generally relates to tracking and predicting user spending, and more particularly toward generating predictions and notifications regarding projected spending based on contextual parameters.

TECHNICAL FIELD

Background

Despite the number of tools available, budgeting and spending management remains a challenge for many people. Particular environments or relations can encourage or discourage spending, and spenders' judgment can be swayed by various influences. Thus, while an individual may decide on a budget or wish to avoid certain expenses, they do not always succeed with these aspirations.

A tremendous amount of minute-by-minute data is available through various devices and sources. Individuals today are tracked almost constantly in their activity. However, users do not often consciously recognize how such activity and the context around it influences spending. Existing technology does not leverage such data to generate predictions about user spending.

Accordingly, there is a need to allow additional data to be analyzed in terms of impacts on spending to provide better control on spending and money management.

Summary

In embodiments systems and methods can provide for collecting user spending context data associated with a user, including location data and relationship data, determining a next event based on at least one of the location data and the relationship data, generating spending correlations between variables of the user spending context data, generating a next event value for the next event having at least a subset of the variables, and transmitting a recommendation to the user based on the next event value, wherein the recommendation identifies at least one action to reduce the next event value.

Additional and alternative aspects will be apparent on review of other portions of this disclosure.

BRIEF DESCRIPTION

So that those having ordinary skill in the art, to which the present disclosure pertains, will more readily understand how to employ the novel system and methods of the present disclosure, certain illustrated embodiments thereof will be described in detail herein-below with reference to the drawings, wherein.

DETAILED DESCRIPTION

Aspects herein generally relate to determining correlations between user activities, and the context around user activities, and spending that occurs during those times. Such correlations can be used to estimate, for ongoing or future events, expected spending. Notifications and recommendations about the expected spending can be transmitted to assist users in controlling excess spending, encouraging responsible spending, sticking to a budget, et cetera. Correlations can be determined using machine learning or other techniques for providing detailed analysis of the influence particular parameters and combinations of parameters have on an output (e.g., spending).

As used herein, a "social media network" or similar terminology (e.g., "social media platform") can be any website, service, or product, whether free or paid, that allows users to register accounts or handles and contribute content. These can include, but are not limited to, Facebook, Google+, Instagram, Twitter, Tumblr, Snapchat, Weibo, Myspace, Nextdoor, and others. Professional networks such as LinkedIn, Vault, or GlassDoor are considered "social media networks" for purposes of this disclosure, as are other interactive sites accepting user content such as YouTube, Reddit, Vine, et cetera. Specialty social networks with subject matter focuses, such as UnTappd or Cor.kz for libations, can also be used for data collection even if no social media account is maintained on the network. Proprietary social networks such as a corporate app or message board are also included. Social media networks can also include gaming environments, including the communication and financial transactional systems within gaming environments.

As used herein, an appliance or smart appliance can include networked devices providing household, commercial, or industrial functionality that are capable of collecting information and transmitting such information over a network. These can include networked and/or learning thermostats, washer/dryers, doorbells, refrigerators, freezers, et cetera.

Figure 1B:
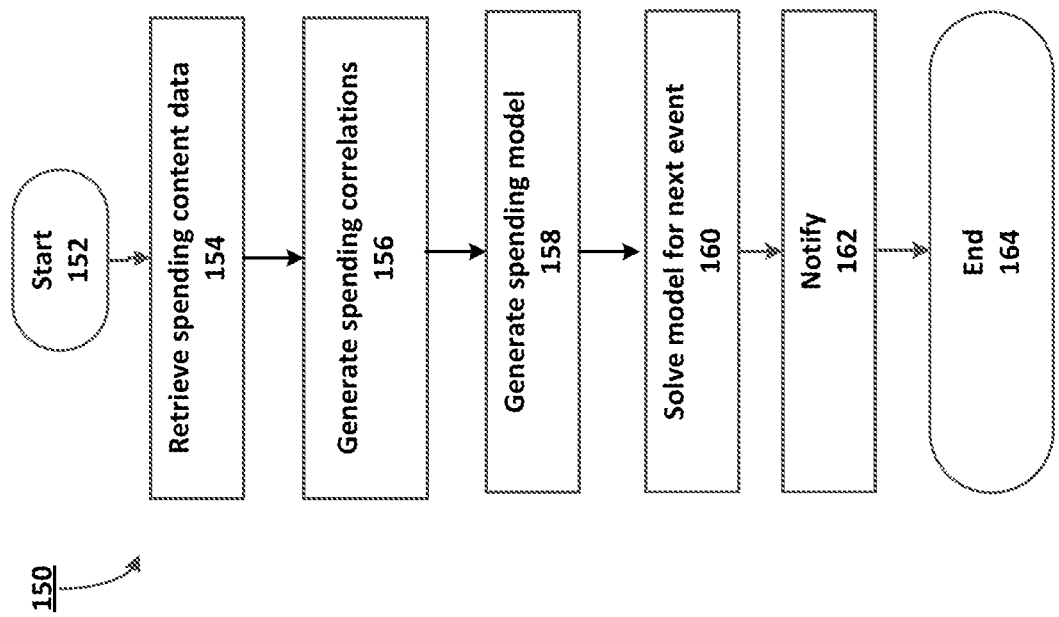
FIG. 1B illustrates a block diagram of an example method of the disclosure.
Figure 1A:
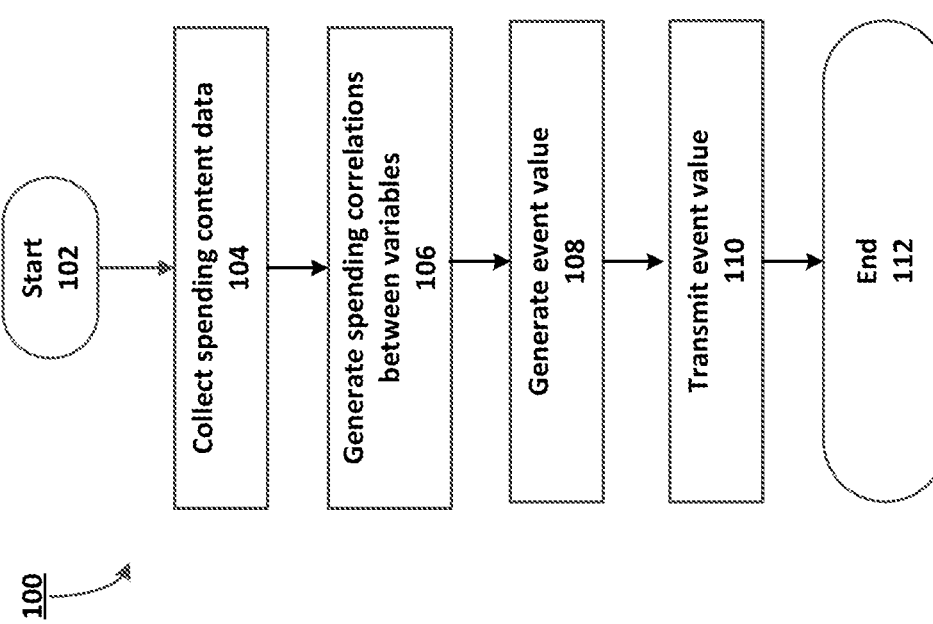
FIG. 1A illustrates a block diagram of an example method of the disclosure.

FIG. 1A illustrates a flow chart of an example methodology 100 disclosed herein. Methodology 100 begins at 102 and proceeds to 104 where spending context data is collected concerning one or more users. As described herein, a user can be any entity spending money. A user can be a user of a social media network. A user can be a user of a device or appliance.

Spending context data is the set of discernible variables associated with user spending. Spending context data can include location. Location can include a variety of characterizations. For example, location can, but need not be, characterized as (but is not limited to): a particular business or vendor, a particular branch of a business or vendor, a zip code or other region, a neighborhood a distance from a home or office, a type of business or vendor, a global position, et cetera, or combinations thereof.

Spending context data can also include time. Time can, but need not be, a time of day, a day of the week, a season or time of year, a month, a time in relation to a particular event (e.g., within a certain amount of time or on a holiday, life event, public event; time since an event, et cetera), time at an event or location, et cetera, and combinations thereof.

Environmental data can also be included in spending context data. Environmental data can include weather generally, precipitation, wind speed, wind direction, temperature, sunrise time, sunset time, moon phase, illumination after sunset, barometric pressure, et cetera, combinations thereof, and absolute or relative changes thereto.

Spending context data can also include an activity or event type. For example, attendance at a dinner, cocktail event, concert, comedy show, sporting event, et cetera, can all be identified as separate event types. Event types can be further characterized in terms of whether the user is participating (e.g., user playing rec rugby) or spectating (e.g., attending a professional baseball game). Type can be broken down by characteristic or sub-type (e.g., the particular sport, league, team and so forth; restaurant menu, cost, ratings, and so forth; whether a bar is a cocktail bar, craft beer bar, dive bar, and so forth; et cetera).

Spending context data can also include user mood or the mood of nearby users. Mood can be discerned or inferred from, e.g., user voice, user device usage (e.g., frequency, duration, word recognition in apps, movement, et cetera), biometric information (e.g., heart rate, blood pressure, perspiration, blood chemical levels, et cetera), et cetera.

Spending context data can also include current news. Current news can be local, national, world news, et cetera, and relate to sports, politics, international relations, finance, et cetera. In embodiments, spending habits can relate to individuals' reactions to personally or generally relevant events unfolding.

User biometric data can also be included in spending context data. Biometric data can be developed by, collected from, or received via various devices, apps, or device accessories configured to interact with user biometrics. Data collected can include but is not limited to sleep amounts or patterns, fatigue, heart rate, blood alcohol, blood sugar, other blood chemistry, perspiration, movement and exercise, eye movement or focus, blood pressure, et cetera. Biometric data can also be inferred through various app use, such as logging food, drink, or exercise, even in circumstances in which this data is not actually detected separate from user entry. Various accessories used to generate biometric data can include but are not limited to various devices or dongles that collect data and can transmit the data over a network or directly to another user device (e.g., smart watch, telephone) through wired or wireless connections. In a non-limiting example, breathalyzer devices for determining or estimating blood alcohol levels can be connected to user smart phones.

In embodiments, biometric data or related data can include a mood of one or more of the user or a known or unknown third party who is present. Mood can be discerned from biometric data, voice(s), communications sent or received by devices, apps, or services, et cetera.

Third parties present can also be included in spending context data. Third parties can include friends, family, coworkers, and other classifications of relationships or acquaintances. Third parties can include social media network users and device users. Particular types of relationships or specific individuals can be analyzed in the context of spending rates, spending durations, and spending amounts. For example, college friends may involve a slower rate of spending at bars but involve a long duration (e.g., multiple rounds of inexpensive drinks over several hours), while clients may involve a higher rate of spending with a shorter duration (e.g., expensive two hour dinner). These generalities may further be refined in terms of the context (e.g., lunch meeting or bar after dinner; meeting at a stadium or a coffee shop; outdoor seating in summer versus indoor seating in early spring; et cetera).

Specific third parties can be identified to associate them with particular spending data and related context in a variety of ways. User devices may infer or confirm the presence of a particular relation based on a variety of explicit and implicit information, including but not limited to location, cross-referencing the locations of multiple users of a spending management service, location data of multiple parties available from partner apps and services, local identification of devices with wireless communication capabilities (including but not limited to visible device IDs or devices detected in proximity), local identification of available networks or connections, analysis of user calendars, analysis of user e-mail or messages, analysis of user app data, analysis of user call logs or call data, microphones and voices or other sound detected, social media tags, et cetera. In embodiments, users can provide input about people who they were interacting with during particular periods. In embodiments, an app can question users regarding whether a particular individual or group was present during an event. Based on this and other data, machine learning can be used to train the service to recognize particular individuals and associate times at which they are collocated or interacting with the user. This information can be included as spending context data.

Group dynamics can factor into analysis of third party influence on spending as well. For example, the presence of a first friend and a second friend may not correlate strongly with user spending, but the presence of both friends with the user can correlate strongly with spending. Thus, the influence of multiple entities, and the context around when multiple entities interact, can be analyzed in conjunction with other contextual factors to define parameters available for analysis with respect to spending.

Spending context data can be received from various databases or using various devices. Databases can include social media databases, banking databases, location databases, databases from various apps and services, et cetera. Devices can include computing devices such as desktop computers, laptop computers, tablets, special purpose consoles, et cetera; mobile devices such as mobile phones, personal digital assistants, smart watches, electronic interfaces embedded in glasses, et cetera; biometric devices, which can include but are not limited to wearable devices, including but not limited to heartrate monitors, step counters, blood alcohol monitors, blood sugar monitors, sleep trackers, eye movement trackers, body temperature trackers, exercise trackers or other movement trackers, food or hydration tracking hardware or software, et cetera; networked appliances or devices such as smart appliances, smart televisions, smart vehicles, and others; conversational interface devices such as voice assistants or smart speakers (e.g., Amazon® Alexa®, Google® Assistant or Home, Apple® Siri®, Microsoft® Cortana®, et cetera), action automation dongles (for re-ordering, notifications, et cetera), other smart home devices not integrated into traditional appliances, et cetera, and others.

Examples of additional data types collected can include any device input or sensor data, including but not limited to accelerometer data, gyroscope data, magnetometer data, barometer data, a unique device identifier, a vendor identifier, global positioning or geolocation data, satellite data, Wi-Fi signal and router data, local network data, cellular network data, ad hoc network data, Bluetooth connection data, device-to-device connection data, step count data, distance traveled data, time moving data, exercise data, heart rate data, user hydration data, blood alcohol data, food consumption data, and others.

As will be understood, the spending that occurs during particular times is also a parameter to be received and analyzed. As such, aspects herein for collecting or receiving data can be configured to query user financial information for times associated with the user spending context data. Spending and other financial information can be collected in substantially real-time, or batched periodically.

As discussed throughout, more than being observed as single variables, variable combinations can be analyzed. Variables can be organized in databases according to time and date, but also based on other parameters observed more than once, to allow the codependence or interaction of various parameters to be discerned. Thus, when a user encounters a single parameter that correlates weakly with spending, an alert may not be generated, but when a user encounters a combination of parameters assessed to correlate strongly with spending, they may receive an alert (even if the precise time, place, or audience may be novel).

For the avoidance of confusion, various systems, services, and/or devices can be configured to collect or receive any data described explicitly or implicitly herein individually or in any combination, but need not collect each and every type of data.

At 106, spending correlations are generated between variables within the contextual spending data. As discussed above, variables related to contextual spending information can be stored and analyzed, in embodiments using machine learning, to identify correlations between variables and spending, or combinations of variables and spending. Various statistical analyses, pattern matching, pattern recognition, et cetera, can be performed. As will be understood, different patterns and correlations are generated for different users, and factors influencing spending need not be based on any common variable or set of variables. While, in methodology 100, this correlation occurs at 106, it is understood based on other portions of this disclosure that discussion of identifying correlations is interleaved throughout and aspects described elsewhere can be utilized herein without departing from the scope or spirit of the innovation.

In embodiments, multiple correlations can be determined. Multiple correlations may apply to a context for which such correlations are being leveraged to estimate spending. In such aspects, a strongest correlation or stronger groups of correlations can be utilized to prioritize the most relevant projections for the particular set can be identified.

At 108, a next event value for a next event having at least a subset of the variables correlated to spending is generated. The next event value can be an estimated total spend for the event, the day of the event, a time period of the event, and others. In embodiments, a next event value can include a spending rate, which can be constant (e.g., $25 per hour) or dynamic (e.g., $15 first hour or before 8:00 PM, $40 for next hour or after 9:00 PM, $20 per hour for next hour or after 10:00 PM, et cetera). During early use of the solution, a next event value can be based on an available set of variables, or if insufficient data is available, can be based on estimates using public or aggregated user data. As the solution is trained to the user, more correlated variables are involved to more accurately estimate the next event value based on the particular context about the user.

While the term "next event" is utilized, it is understood that the next event can be a current event, ongoing event, or other event that is beginning or underway. In embodiments, multiple next events can be identified or projected based on user history (e.g., going out for food after a day baseball game). Any projected, ongoing, or future expected spending can be analyzed in view of detected context.

A next event (or other spending) can be identified in manners similar to contextual spending data. Various inputs can identify, in an ongoing, real-time manner, context about a user, and such context can be provided to determine likely activities, events, interactions, and associated spending based on previously-determined correlations between contextual spending data and spending. In embodiments, current information used to determine a next event can be thereafter stored as contextual spending data.

At 110, a notification is transmitted to the user based on the next event value. The notification can advise a user of a projected spend at the next (or current, et cetera) event, projected spending rates, and others. The notification can be based on a comparative event value, either based on the user's own previous activity or aggregated data (e.g., comparison of how much all users spend, how much a peer group spends, how much a relationship spends, in similar context, et cetera). The notification can be transmitted via a graphic user interface (GUI) or an application.

In embodiments, a notification can include a behavioral recommendation. For example, the notification can advise the user to control spending, warn them of a likely increase in spending at a certain time during the event. Further, users can provide feedback on their satisfaction with previous spending and be given notifications (negative warnings or positive encouragement) based thereon.

In embodiments, the notification can be based on a user setting. The user setting may be a user budget. The user can budget a value for particular events, or provide (or provide access to) an overall budget. Further aspects can include determining an event budget value for the next event. This can be an average for the user, an average for a peer group, based on a provided spending or saving goal or budget, et cetera. Further aspects can include calculating a spending difference between a next event value and the event budget value (e.g., what is the expected spend based on the contextual data and corresponding next event value, and how does this compare to the budget). The notification can be based on this difference. In an embodiment, the notification can warn that the spending will exceed the budget by a proportion or dollar amount. In an embodiment, the notification can commend the user for remaining below the budget.

In alternative or complementary embodiments, aspects can include collecting real-time user spending data at the next event and determining a difference between the sum of the real-time user spending data and the next event value. Budgets can also be considered in such embodiments. The notification can be based on the difference between the sum of the real-time user spending data and the next event value.

In alternative or complementary embodiments, aspects can include determining a user budget (e.g., based on user input, based on input or data from another application or banking service, based on suggestions to a user in view of their financial information, et cetera) and deducting the next event value from the user budget to determine a remaining budget, wherein the notification is further based on the remaining budget. In embodiments, real-time budgeting can occur to display or notify a user how much budget remains either for the event or in their budget (e.g., daily, weekly, or monthly categorized expenses for, e.g., food, entertainment, travel, et cetera). Budgets can be automatically adjusted based on previous action, context, or user goals for saving or spending.

Further, after events, users can be queried to determine their satisfaction or happiness with the event in view of the pricing. Over time, recommendations can be developed to transmit notifications to discourage spending at events which offer low emotional or tangible returns on spending.

At 112, methodology 100 can end.

FIG. 1B illustrates a flow chart of an example methodology 150 disclosed herein. Methodology 150 begins at 152 and proceeds to 154 where spending context data is received. In embodiments herein, data need not be collected directly but can be received or access in an existing database. Thus, techniques used herein need not be provided direct access to devices or sensors, but can be access repositories of data containing information therefrom.

At 156 correlations between context data and spending can be generated. Various statistical analyses, machine learning, artificial intelligence, and other techniques can be used to correlate contextual factors or combinations thereof with spending.

Thereafter, at 158, a user model can be defined that correlates spending and context. The model can facilitate ongoing contextual datapoints as inputs and provide outputs in terms of expected spending. At 160, the model can be solved, based on emerging, ongoing, or future contextual data, for a next event value. At 162 a user can be sent a notification (e.g., to a device or address associated with the user) based on the next event value. The notification may include a recommendation, such as an action to reduce the next event value.

In embodiments, data collection and analysis can occur using a server or computing device, and user devices can include a companion application configured to receive and display notifications based on information described herein. Such application can be a banking application or any other type of application. In embodiments, the server can send notifications to the user via the application. In embodiments, the server can send, e.g., e-mails, text messages, voice messages, messaging app messages, and other communication, to facilitate notification without the presence of a proprietary application. Thereafter, at 164, methodology 150 can end.

In embodiments, additional aspects can determine the accuracy of predicted spending based on a model or correlations and revise the model or user statistics based thereon. For example, the next event value is consistently high or low, at all times or based on certain variables, the model or correlations may be corrected or revised to account for the real-world outcomes in view of predictions.

While methodologies 100 and 150 are shown separately to provide examples of different aspects in different embodiments, it is understood that aspects of one or both can be used in alternative or complementary methodologies, or implemented in various systems described herein, without departing from the scope or spirit of the innovation. The particular combinations of functionality available in a given embodiment is only limited by the imagination or desire of developers or users.

Figure 2:
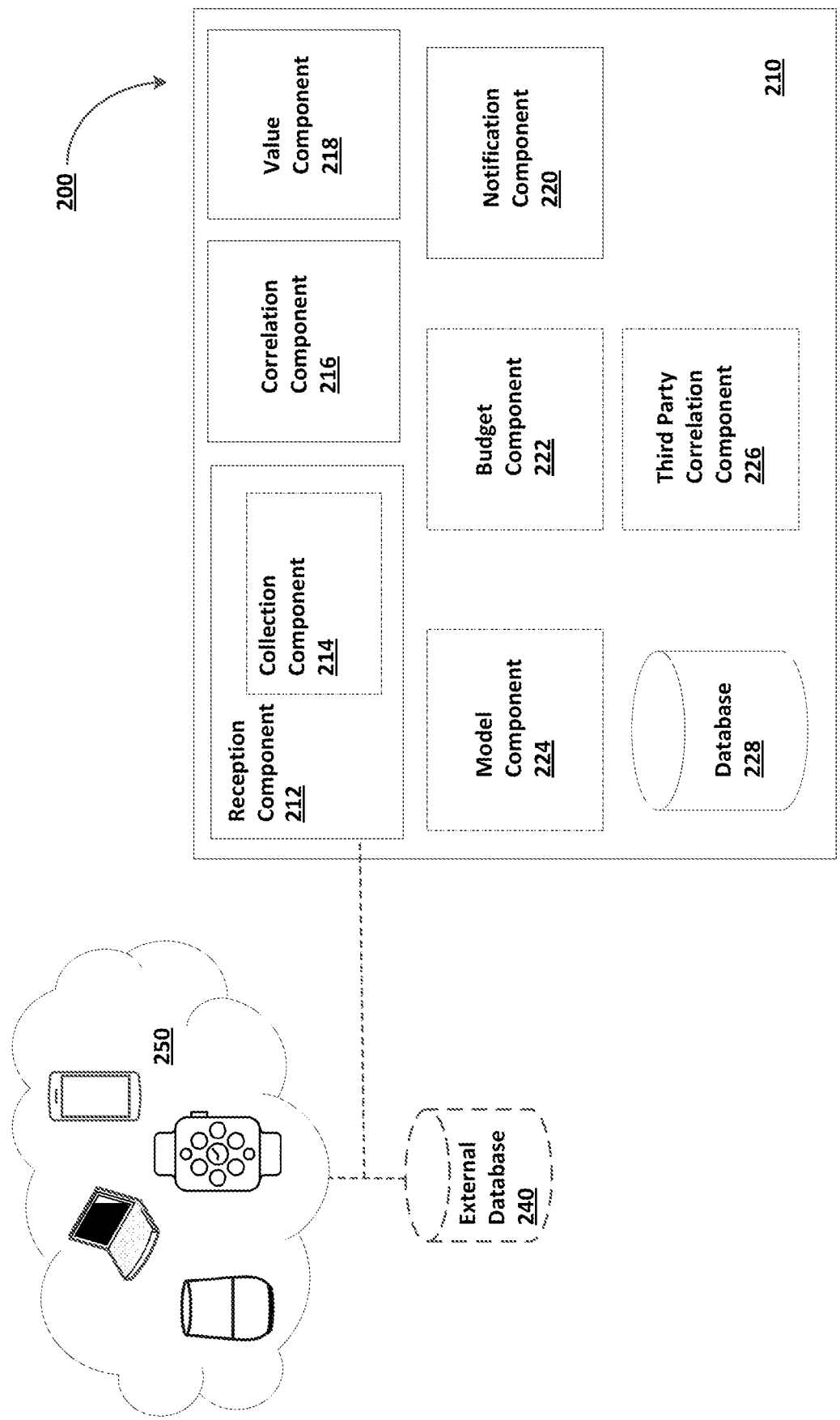
FIG. 2 illustrates a block diagram of an example system of the disclosure.

FIG. 2 illustrates an example system 200 including contextual spending correlation system 210, which can interact with external databases 240 and devices 250. Spending correlation system 210 can be located on a server or in a group of servers in a datacenter or cloud environment. In such embodiments, spending correlation system 210 can utilize a companion application on a user device, or leverage other applications or communication means to send users notifications, and in embodiments to collect information from user devices for analysis. In alternative embodiments, spending correlation system 210 can be located locally on an individual device.

Spending correlation system 210 includes reception component 212, which is configured to receive various spending data and spending context data. Collection component 214 can be a part of reception component 212, or can be a standalone component, for collecting data from various devices or sensors. Such component(s) can include various communication capabilities and/or Application Programming Interfaces (APIs) for accessing different devices, applications, servers, databases, sensors, et cetera.

Spending correlation system 210 also includes correlation component 216. Correlation component 216 can organize and analyze various spending data in view of spending context data to determine correlations between context and spending. Correlation component 216 can include or utilize machine learning, artificial intelligence, and/or various other statistical analysis and pattern recognition techniques for single parameters or multiple interacting parameters.

Spending correlation system 210 also includes value component 218. Value component 218 utilizes the correlations determined by correlation component 216 to determine an expected value or cost of additional events or periods of time based on recent past, ongoing, or predicted context.

Spending correlation system 210 also includes notification component 220. Notification component 220 is configured to notify one or more users with messages related to at least next or current event values. Other notifications can be sent as well, such as notifications describing trends or habits discerned from the context data.

In some embodiments, spending correlation system 210 includes budget component 222. Budget component 222 can be configured to receive a user budget, or can be used to define a user budget (automatically or with user input). In such embodiments, user budgets can be compared to next or current event values, and notifications can be based on comparisons of those values to budgets.

In some embodiments, spending correlation system 210 includes model component 224 configured to determine a user spending model based on the spending correlations, wherein the next event value is based on the user spending model. The model can include equations, matrices, spreadsheets, et cetera, which receive contextual data as quantitative or qualitative inputs and provide outputs in terms of spending, which can be absolute amounts, spending rates, et cetera.

In some embodiments, spending correlation system 210 includes third party correlation component 226. Third party correlation component 226 can analyze data regarding third parties to infer or confirm the presence of third parties at particular events or locations at particular times, separate from other correlations drawn. Based on collection and analysis of data described herein relating to third parties, presence or interaction with respect to third parties can be ascertained.

Spending correlation system 210 can include database 228. Database 228 can store various spending data, spending context data, correlations generated, et cetera. In embodiments, spending correlation system 210 can further communicate with, or alternatively use, external database 240 to collect or store various data described herein.

As will be understood, spending correlation system 210, or similar systems (e.g., distributed differently in one or more computing systems) can implement any aspect described herein, whether in systems or methods described, without departing from the scope or spirit of the disclosure.

Further examples of systems and methods herein can analyze historic spending data. Historic data can be categorized according to, e.g., who was present where and when.

Average amounts spent at locations can be determined and projected. Average amounts can be compared when a user is alone versus when the user is in the presence of one or more particular others, or any others. Amounts spent with particular or generic groups can be calculated historically and projected forward. Spending during ongoing or recently passed trips can be compared to earlier trips to the same location or sharing similar characteristics. Spending amounts can be compared to budgets, if the user has one, or automatically-generated budgets based on recommendations or suggestions. Notifications can advise a user how much they would save if they did not attend particular events with particular parties. Notifications can suggest alternative activities or groups which result in lower spending. Notifications can suggest a number of times a user can engage with a particular individual or group, or attend a particular event or type of event, to stay within a budget.

Figure 3:
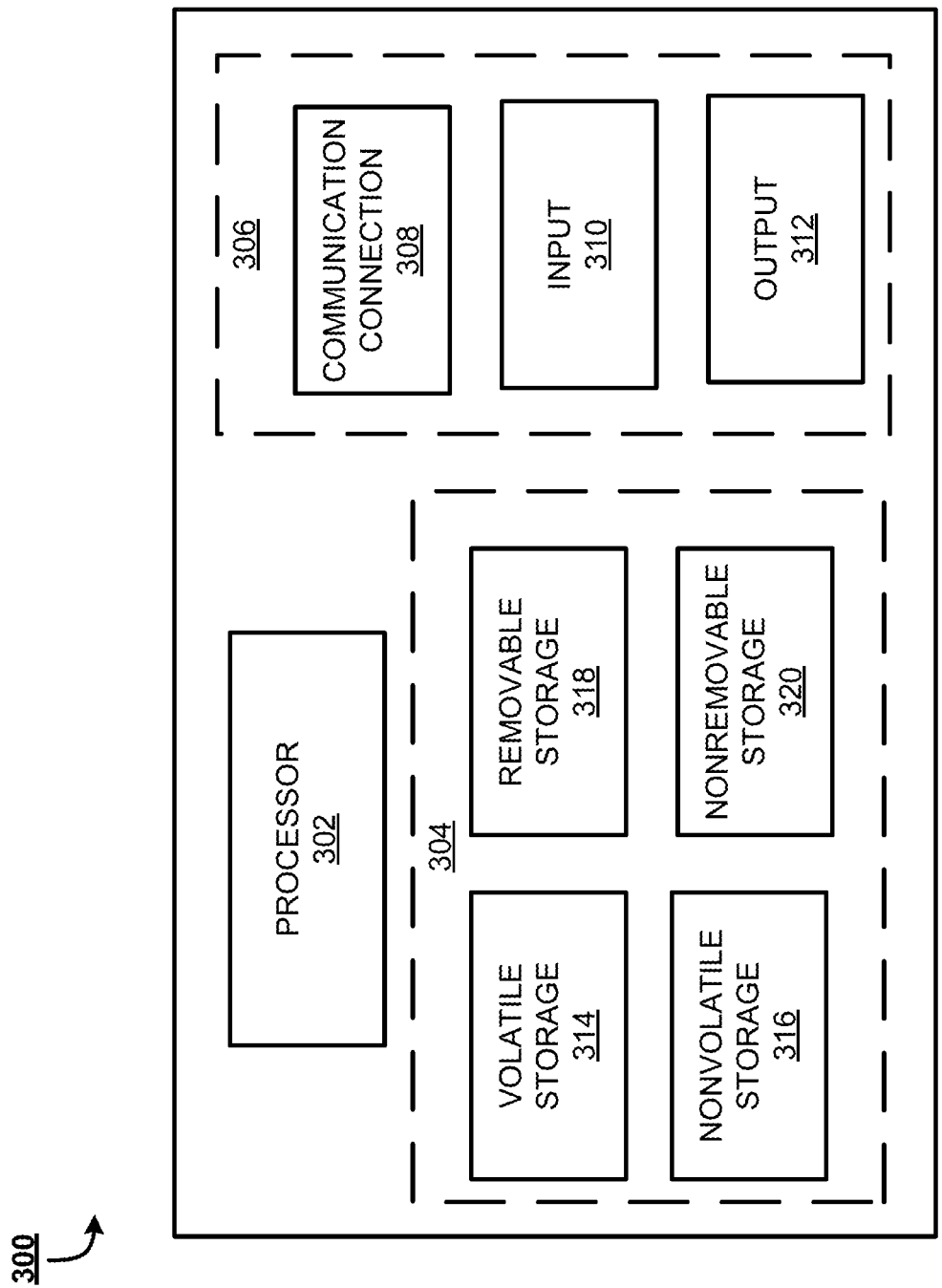
FIG. 3 is a block diagram illustrating an example implementation of a device which can be utilized in conjunction with or comprise a portion of systems disclosed.

FIG. 3 illustrates a device 300. Device 300 may comprise all or a part of modules or components herein. Device 300 may comprise system 200, spending correlation system 210, external databases 240, devices 250, or any of the modules in FIG. 2. Device 300 may comprise hardware or a combination of hardware and software. The functionality to facilitate telecommunications via a telecommunications network may reside in one or combinations of links, portals, or connections. Device 300 depicted in FIG. 3 may represent or perform functionality of an appropriate device 300, or combination of modules or components herein. It is emphasized that the block diagram depicted in FIG. 3 is example and not intended to imply a limitation to a specific implementation or configuration. Thus, device 300 may be implemented in a single device or multiple devices. Multiple network entities may be distributed or centrally located. Multiple network entities may communicate wirelessly, via hard wire, or any appropriate combination thereof.

Device 300 may comprise a processor 302 and a memory 304 coupled to processor 302. Memory 304 may contain executable instructions that, when executed by processor 302, cause processor 302 to effectuate operations associated with aspects disclosed herein. As evident from the description herein, device 300 is not to be construed as software per se.

In addition to processor 302 and memory 304, device 300 may include an input/output system 306. The input/output system 306 may be any of the components in FIG. 2. Processor 302, memory 304, and input/output system 306 may be coupled together (coupling not shown in FIG. 3) to allow communications there between. Each portion of device 300 may comprise circuitry for performing functions associated with each respective portion. Thus, each portion may comprise hardware, or a combination of hardware and software. Accordingly, each portion of device 300 is not to be construed as software per se. Input/output system 306 may be capable of receiving or transmitting information from or to a communications device or other network entities configured for telecommunications. For example input/output system 306 may include a wireless communications (e.g., Wi-Fi/2.5G/3G/4G/GPS) card. Input/output system 306 may be capable of receiving or sending video information, audio information, control information, image information, data, or any combination thereof. Input/output system 306 may be capable of transferring information with device 300. In various configurations, input/output system 306 may receive or transmit information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of device 300 also may contain communication connection 308 that allows device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with aspects described herein. For example, processor 302 may be capable of, in conjunction with any other portion of device 300, managing social media communications as described herein.

Memory 304 of device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 300. Memory 304 may comprise executable instructions that, when executed by processor 302, cause processor 302 to effectuate operations for, e.g., listening to social media activity.

Figure 4:
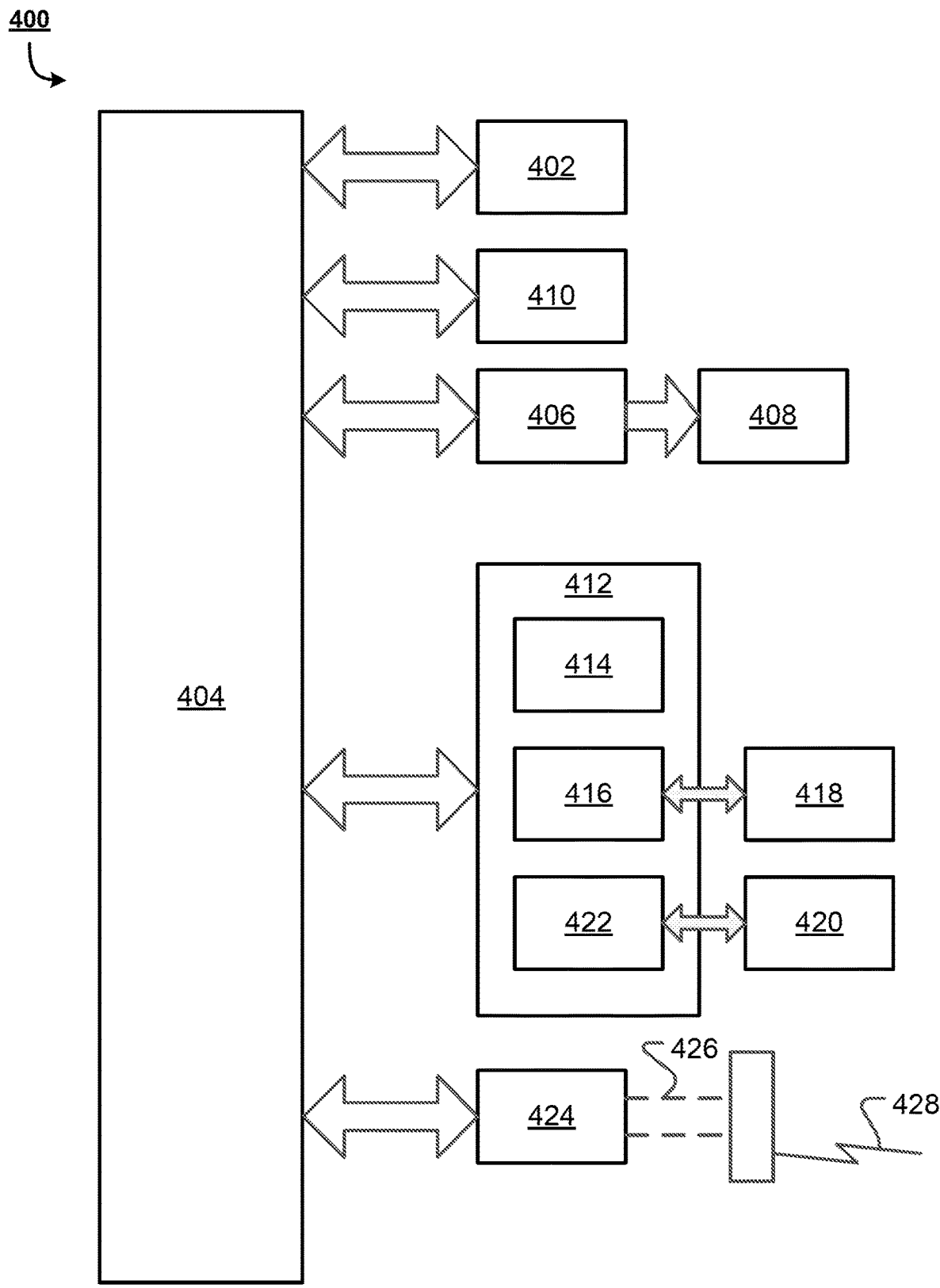
FIG. 4 is a block diagram of a computer system that can be used to implement at least a portion of aspects herein.

FIG. 4 illustrates a computer-based system 400 that may constitute or include parts of one or more of aspects of, e.g., FIGS. 1 and/or 2, or device 300. Computer-based system 400 includes at least one processor, such as a processor 402. Processor 402 may be connected to a communication infrastructure 404, for example, a communications bus, a crossover bar, a network, or the like. Various software aspects are described in terms of this example computer-based system 400. Upon perusal of the present description, it will become apparent to a person skilled in the relevant art(s) how to implement the present disclosure using other computer systems or architectures.

Computer-based system 400 includes a display interface 406 that forwards graphics, text, or other data from communication infrastructure 404 or from a frame buffer (not shown) for display on a display unit 408. The display interface 406 may be a graphic user interface (GUI). The display interface 406 may display an application, such as the companion application, the banking application, or another application used to display notifications to a user.

Computer-based system 400 further includes a main memory 410, such as random access memory (RAM), and may also include a secondary memory 412. Secondary memory 412 may further include, for example, a hard disk drive 414 or a removable storage drive 416, representing a floppy disk drive, a magnetic tape drive, an optical disk drive, etc. Removable storage drive 416 reads from or writes to a removable storage unit 418 in a well-known manner. Removable storage unit 418 may represent a floppy disk, magnetic tape, or an optical disk, and may be read by and written to by removable storage drive 416. As will be appreciated, removable storage unit 418 includes a computer usable storage medium having computer software or data stored therein.

In accordance with various aspects of the present disclosure, secondary memory 412 may include other similar devices for allowing computer programs or other instructions to be loaded into computer-based system 400. Such devices may include, for example, a removable storage unit 420 and an interface 422. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 420 to computer-based system 400.

Computer-based system 400 may further include communication interface 424. The communication interface 424 may be an application, such as an application used to display notifications to a user. Communication interface 424 may allow software or data to be transferred between computer-based system 400 and external devices. Examples of communication interface 424 include, but may not be limited to a modem, a network interface (such as an Ethernet card), a communications port, a Personal Computer Memory Card International Association (PCMCIA) slot and card, or the like. Software or data transferred via communication interface 424 may be in the form of a number of signals, hereinafter referred to as signals 426, which may be electronic, electromagnetic, optical or other signals capable of being received by communication interface 424. Signals 426 may be sent to communication interface 424 via a communication path (e.g., channel) 428. Communication path 428 carries signals 426 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 416, a hard disk installed in hard disk drive 414, or the like. These computer program products provide software to computer-based system 400. The present disclosure is directed to such computer program products.

Computer programs (also referred to as computer control logic) may be stored in main memory 410 or secondary memory 412. The computer programs may also be received via communication interface 404. Such computer programs, when executed, enable computer-based system 400 to perform the functions consistent with the present disclosure, as discussed herein. In particular, the computer programs, when executed, enable processor 402 to perform the features of the present disclosure. Accordingly, such computer programs represent controllers of computer-based system 400.

In accordance with an aspect of the present disclosure, where the disclosure is implemented using a software, the software may be stored in a computer program product and loaded into computer-based system 400 using removable storage drive 416, hard disk drive 414, or communication interface 424. The control logic (software), when executed by processor 402, causes processor 402 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special-purpose computer, or other programmable data processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications in systems and networks discussed herein.

Methodologies herein are described with specific aspects for ease of explanation with respect to various embodiments. However, methodologies embraced under the scope and spirit of the disclosure may vary, to include excluding particular aspects or comparisons described.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:

1. A method, comprising:
   collecting user spending data associated with a user;
   collecting, using at least one user sensor on a device associated with the user, user spending context data associated with the user spending data, the user spending context data including location data, relationship data, and a mood of the user, wherein the mood of the user is determined using one or more of a voice of the user, device usage of the user, and biometric information of the user;
   identifying a first relation in proximity to the user based on the relationship data and a first relation sensor of a first relation device associated with the first relation;
   identifying a second relation in proximity to the user based on the relationship data and a second relation sensor of a second relation device associated with the second relation;
   receiving relation spending data describing spending associated with the first relation and the second relation;
   identifying a group dynamic based on the first relation, the second relation, the user spending data, and the relation spending data;
   generating spending correlations between the user spending data, the user spending context data, and the group dynamic;
   training machine learning using the spending correlations;
   determining a next event based on at least one of the location data and the relationship data, wherein the next event includes the first relation and the second relation in proximity to the user;
   generating, using the machine learning, a next event value for the next event based on at least the user spending data and the group dynamic;
   collecting real-time user spending data at the next event;
   determining a difference between a sum of the real-time user spending data and the next event value; and
   transmitting a recommendation to the user based on the difference between a sum of the real-time user spending data and the next event value, wherein the recommendation identifies at least one action to reduce the next event value.

2. The method of claim 1, wherein collecting user spending context data is performed using a smart phone, a wearable biometric device, a conversational interface device, a vehicle, or an appliance.

3. The method of claim 1, comprising:
   selecting a strongest correlation, wherein generating spending correlations between variables identifies two or more correlations, and wherein generating a next event value is based on the strongest correlation.

4. The method of claim 1, further comprising:
   querying user financial information for times associated with the user spending context data.

5. The method of claim 1, wherein the user spending context data includes device input data, and wherein the device input data includes accelerometer data, gyroscope data, magnetometer data, barometer data, a unique device identifier, a vendor identifier, global positioning or geolocation data, satellite data, Wi-Fi signal and router data, local network data, cellular network data, ad hoc network data, Bluetooth connection data, device-to-device connection data, step count data, distance traveled data, time moving data, exercise data, heart rate data, user hydration data, blood alcohol data, food consumption data, and others.

6. The method of claim 1, comprising:
   querying the user regarding the user's satisfaction with one or more past events associated with the user spending data; and
   receiving one or more satisfaction responses to the query from the user, wherein the machine learning is trained on the one or more satisfaction responses,
   wherein the next event value is based on the satisfaction responses.

7. A system, comprising:
a non-transitory computer-readable medium storing instructions that when executed by a processor effectuate:
a reception component configured to receive, at least in part using a sensor of a device associated with a user, user spending data associated with the user, wherein the reception component is configured to receive user context data, the user spending context data including location data, relationship data, and a mood of the user, wherein the mood of the user is determined using one or more of a voice of the user, device usage of the user, and biometric information of the user, and wherein the reception component is configured to receive real-time user spending data; a third-party correlation component configured to:
   identify a first relation in proximity to the user based on the relationship data and a first relation sensor of a first relation device associated with the first relation,
   identify a second relation in proximity to the user based on the relationship data and a second relation sensor of a second relation device associated with the second relation,
   receive relation spending data describing spending associated with the first relation and the second relation, and
   identify a group dynamic based on the first relation, the second relation, the user spending data, and the relation spending data;
a correlation component configured to generate spending correlations between the user spending data, the user spending context data, and the group dynamic, wherein machine learning is trained on the spending correlations;
a model component configured to determine a next event based on at least one of the location data and the relationship data, wherein the next event includes the first relation and the second relation in proximity to the user;
a value component configured to generate, using the machine learning, a next event value for the next event based on the user data and the group dynamic; and
a notification component configured to transmit a recommendation to the user based on a difference between a sum of the real-time user spending data during the next event and the next event value, wherein the recommendation identifies at least one action to reduce the next event value.

8. The system of claim 7, further comprising:
collection component configured to collect at least a portion of the user spending context data from one or more user devices.

9. The system of claim 7, further comprising:
a model component configured to determine a user spending model based on the spending correlations, wherein the next event value is based on the user spending model.

10. A non-transitory computer-readable medium comprising instructions that, when executed, cause operations comprising:
collecting user spending data associated with a user;
collecting, using at least one user sensor on a device associated with the user, user spending context data associated with the user spending data, the user spending context data including location data, relationship data, and a mood of the user, wherein the mood of the user is determined using one or more of a voice of the user, device usage of the user, and biometric information of the user;
identifying a first relation in proximity to the user based on the relationship data and a first relation sensor of a first relation device associated with the first relation;
identifying a second relation in proximity to the user based on the relationship data and a second relation sensor of a second relation device associated with the second relation;
receiving relation spending data describing spending associated with the first relation and the second relation;
identifying a group dynamic based on the first relation, the second relation, the user spending data, and the relation spending data;
generating spending correlations between user spending data, the user spending context data, and the group dynamic;
training machine learning using the spending correlations;
determining a next event based on at least one of the location data and the relationship data, wherein the next event includes the first relation and the second relation in proximity to the user;
generating a next event value for the next event based on the user spending data and the group dynamic;
collecting real-time user spending data at the next event;
determining a difference between a sum of the real-time user spending data and the next event value; and
transmitting a recommendation to the user based on the difference between a sum of the real-time user spending data and the next event value, wherein the recommendation identifies at least one action to reduce the next event value.

11. The non-transitory computer-readable medium of claim 10, wherein the recommendation includes at least a behavioral recommendation, wherein the behavioral recommendation is based on the next event value.

12. The non-transitory computer-readable medium of claim 10, wherein the recommendation is further based on a comparative event value.

13. The non-transitory computer-readable medium of claim 10, wherein the operations further comprise:
determining a user budget; and
deducting the next event value from the user budget to determine a remaining budget, wherein the recommendation is further based on the remaining budget.

14. The non-transitory computer-readable medium of claim 10,
wherein collecting user spending context data is performed using one or more of a smart phone, a wearable biometric device, and a conversational interface device.

15. The non-transitory computer-readable medium of claim 10, wherein the operations further comprise:
querying the user regarding the user's satisfaction with one or more past events associated with the user spending data; and
receiving one or more satisfaction responses to the query from the user, wherein the machine learning is trained on the one or more satisfaction responses,
wherein the next event value is based on the satisfaction responses.

16. The non-transitory computer-readable medium of claim 10, wherein the machine learning is trained on an indication of user satisfaction with one or more past events.

* * * * *